Jan. 7, 1958          W. C. BOYCE          2,819,033
RETRACTABLE FITTING FOR RELEASE SYSTEM
Filed June 1, 1955          2 Sheets–Sheet 1
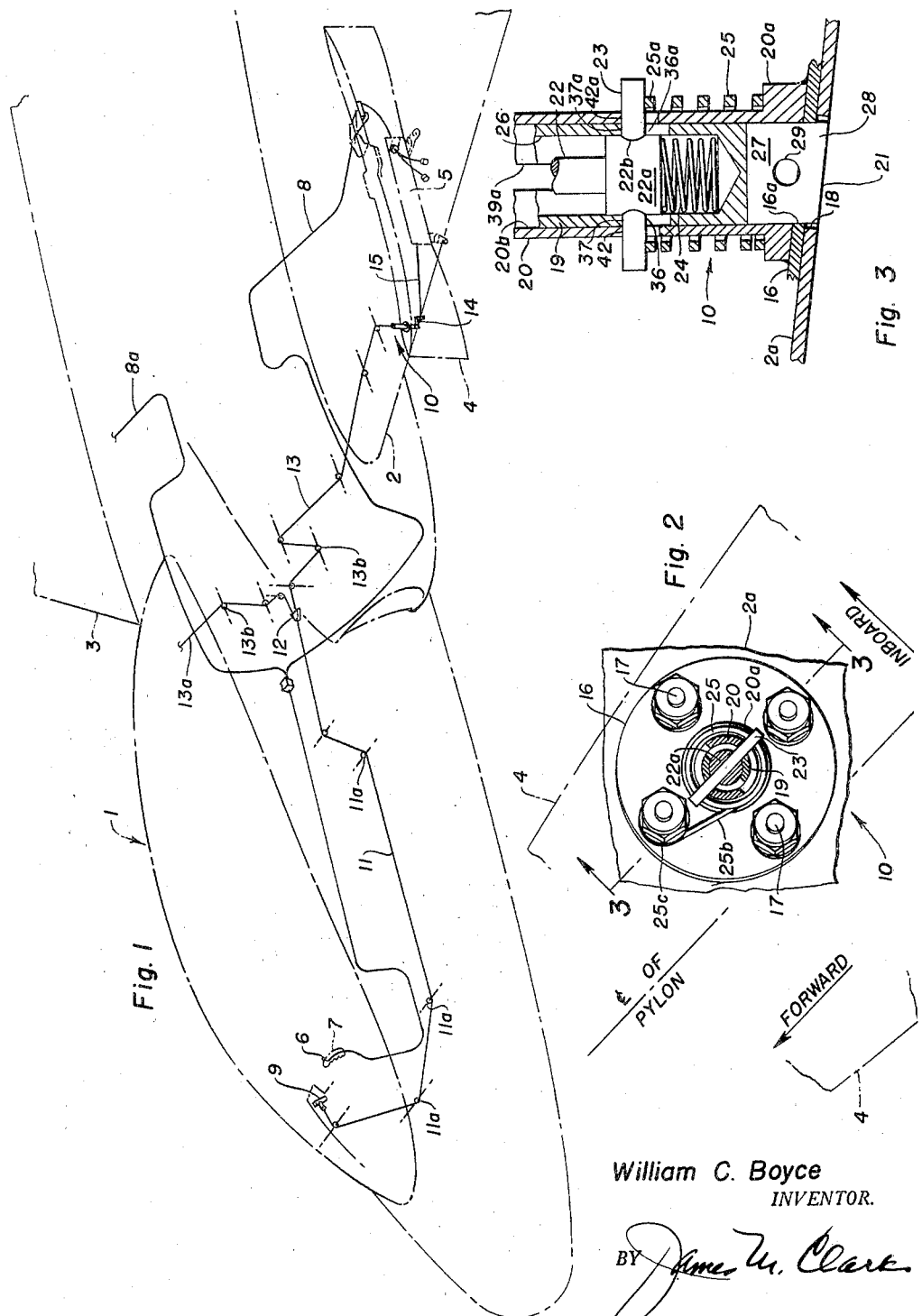
William C. Boyce
*INVENTOR.*
BY *James M. Clark*
*ATTORNEY.*

Jan. 7, 1958 W. C. BOYCE 2,819,033
RETRACTABLE FITTING FOR RELEASE SYSTEM
Filed June 1, 1955 2 Sheets-Sheet 2

William C. Boyce
INVENTOR.

BY *James M. Clark*

ATTORNEY.

United States Patent Office 2,819,033
Patented Jan. 7, 1958

2,819,033

RETRACTABLE FITTING FOR RELEASE SYSTEM

William C. Boyce, Dallas, Tex., assignor to Chance Vought Aircraft, Incorporated, Dallas, Tex., a corporation of Delaware Application June 1, 1955, Serial No. 512,359

12 Claims. (Cl. 244—137)

The present invention relates generally to control actuating mechanisms and more particularly to a disconnectable fitting which is retractable into a flush relationship with the surface of the body within which it is mounted.

In a preferred embodiment of the present invention, it relates to a retractable, telescoping wing fitting for linking a manual release system cable in the wing of an airplane to a release system component in an auxiliary body which may be removably mounted beneath the wing or other component of an airplane. The auxiliary body may be in the form of a pylon or mount for carrying bombs or other external stores or expendable items and the retractable fitting is such that when the pylon is removed from the wing, the fitting may, from a position outside the wing, readily be locked in a stowed position in which no slack is introduced into the manual release system cable within the wing, and the lower end of the fitting is disposed and retained flush with the wing's lower surface.

It is, accordingly, a major object of this invention to provide a device for linking a manual release system cable in the wing of an airplane to a release system component in an external stores-carrying pylon or similar auxiliary body removably mounted beneath the wing. It is a further object of the present invention to provide a fitting for such a device which, when the pylon is removed from the wing, may readily be locked in a stowed position wherein no slack or play is introduced into the manual release system cable within the wing or the fuselage of the airplane. It is a further and corollary objective to provide such a device in which the lower end of the fitting is disposed substantially flush with the wing's lower surface in the retracted position of the device.

Other objects and advantages of the present invention reside in both its general overall arrangement and in the details of its respective components, and will become apparent to those skilled in the art following a reading of the present description, taken in conjunction with the accompanying drawings, forming a part hereof, in which:

Fig. 1 shows a phantom diagrammatic view of a forward portion of the fuselage and wings of an airplane having a release system to which a preferred form of the improved retractable fitting has been applied within the wings of the airplane;

Fig. 2 is an enlarged sectional plan view of the fitting incorporated in the system shown in Fig. 1, and as taken along the lines 2—2 of Fig. 4;

Fig. 3 is an enlarged vertical sectional view of the improved fitting looking inboard as taken along the lines 3—3 of Fig. 2;

Figures 4, 5, 6, 7:
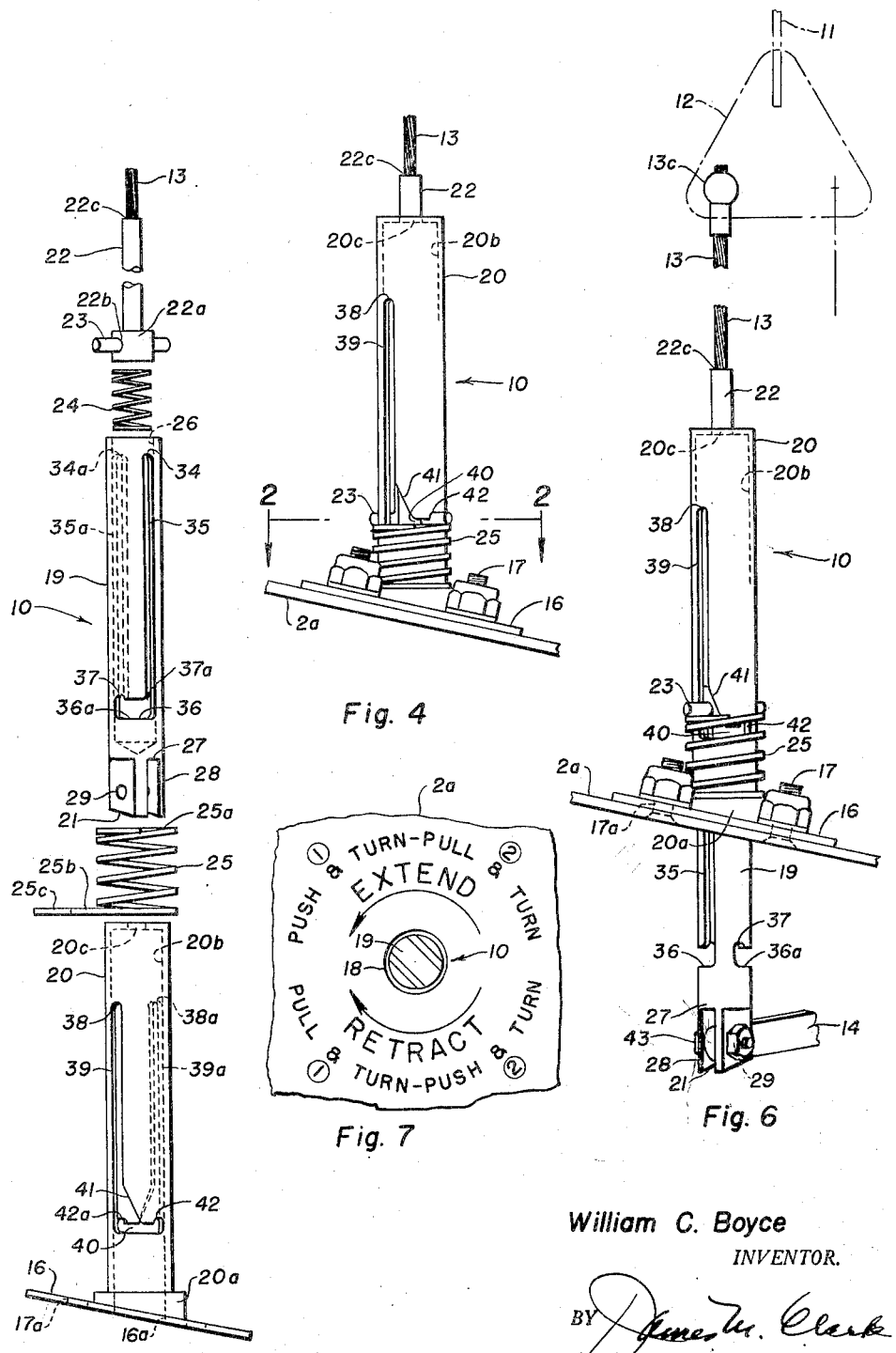
Fig. 4 is an elevational view of the fitting in its retracted condition.
Fig. 5 is an exploded view of the components of the improved retractable fitting.
Fig. 6 is a view of the fitting in its extended operative condition and connected to a release component within the auxiliary body.
Fig. 7 is a bottom plan view of the assembly of Fig. 4 setting forth instructions for operating the retractable fitting.

Referring now to Fig. 1, the numeral 1 indicates the fuselage portion of an airplane having laterally extending left and right wings 2 and 3, respectively. Under the left-hand wing 2 is rigidly mounted a removable pylon or auxiliary body 4; a similar pylon or auxiliary body, although not shown in the drawing, is rigidly mounted under the right-hand wing 3. Each of the pylons 4 is adapted for carrying external stores, such as bombs and the like, and is further adapted for releasing the external stores in flight at the will of the pilot. The release mechanism of each pylon 4 is indicated diagrammatically by the numeral 5 and is integrally a part of the pylon, operating in conjunction with a bomb release system in the airplane. In normal operation, the bomb release system is electrically actuated by manipulation of a button-type bomb release switch 6 located on the pilot's control stick grip 7 and electrically connected to the pylon release mechanism 5 by the wires 8 and 8a in the bomb release cable system.

In the event of malfunction of the bomb release mechanism electrical components, or if for other reasons the pilot is unable to accomplish electrical release of the pylon-carried bombs, emergency release may be effected by means of the manually operated release system and its improved components. In such an emergency, the pilot may simultaneously release the bombs or other loads carried by both pylons 4 by pulling the emergency release handle 9 in the cockpit of the fuselage 1 in the aft direction to the full extent of its travel. This aftward motion of the handle 9 is transmitted to the improved retractable fittings 10 through the forward cable 11 extending over the sheaves 11a to the yoke 12 to which the left and right hand wing cables 13 and 13a are connected. The outboard ends of the cables 13 and 13a are connected to the retractable fitting assemblies 10, that for the left hand wing 2 only being shown in Fig. 1, but the cable 13a being similarly connected to an opposite-handed but otherwise identical retractable fitting in the right hand wing 3. The retractable fitting 10 in each wing is actuated, or receives motion imparted to it, by the wing cables 13 and 13a running over the sheaves 13b and transmits this motion to a component 14 which is mounted within the respective pylon 4 and to which the fitting 10 is connected. Each component 14 is pivotally connected to a rearwardly extending link 15 which in turn is operatively connected to the manual emergency release mechanism 5 contained within the respective pylon 4. This motion transmitted into the pylon-contained emergency release system linkage (the emergency release mechanism being of conventional type and not being shown here in detail) causes mechanical release of the bombs or other loads from the pylon 4. The retractable fitting assembly 10 best serves as a link between the emergency release cable 13 or 13a in the wing 2 or 3 in which it is installed and the emergency release linkage contained in, and removable with, the pylon of that wing. When the pylon 4 is removed from a wing (either 2 or 3) the fitting 10 is left extending below the wing, but may readily be stowed and locked in a retracted position wherein its lower end is flush with the lower surface 2 of the wing, and no slack is introduced into the wing cable, be it 13 or 13a.

Referring now to the remaining figures, the retractable fitting 10 comprises an inner tube 19 axially slidable in an outer tube 20 which is rigidly attached at its mounting plate 16 by the fasteners 17 to the inner surface of the wing lower skin 2a, the skin 2a and plate 16 being apertured at 17a. In its retracted position, the inner tube 19 extends through a hole 18 in the lower skin 2a to a point at which its lower end 21 is substantially flush with the outer surface of the skin. Referring more particularly to Fig. 2, the fitting mounting plate 16 is located within the wing immediately over the forward end portion of the pylon 4, and directions for the operation of the fitting 10 are preferably stenciled or otherwise marked on the under-surface of the wing lower skin 2a in an area adjacent to the opening 18, as indicated in Fig. 7.

As shown in Figs. 4 to 6, inclusive, the retractable fitting comprises the outer tube 20 formed with a hub 20a which in turn is welded to the mounting plate 16; the inner tube 19 which is longitudinaly slidable within the bore 20b of the outer tube 20 and into the bottom of which it is insertable; the rod 22 which carries the lock pin 23 and into the upper end of which rod 22 is swaged the outboard end of the cable 13; an inner spring 24; and an outer spring 25. The rod 22 is of uniform diameter throughout its length with the exception of an enlarged collar portion 22a machined at its lower end. A transverse pin hole 22b is drilled diametrically through the collar portion 22a for the transverse locking pin 23. At its outboard end, the wing cable 13 is swaged into a longitudinally drilled hole 22c at the upper end of the rod 22, and at its inboard end the wing cable is provided with a terminal 13c for connection of the cable 13 at this end to the yoke 12 as indicated in Fig. 6.

The inner tube 19 is rendered tubular throughout most of its length by a longitudinally drilled hole 26 extending downward from its upper open end to a point immediately above the upper end of the cleft 27 which is cut upward from the lower end of the tube 19 along its centerline. The longitudinal hole 26 is of slightly larger diameter than the collar portion 22a of the rod 22. The cleft 27 divides the lower end of the inner tube 19 into a bifurcated terminal 21 displaying two prong portions 28 which are pierced by coaxial, transversely drilled bolt holes 29. A pair of slots with longitudinally extending main portions 35 and 35a are cut through the walls of the inner tubular member 19 and, as shown in Fig. 5, the near slot portion 35 terminates near the upper end of the tube 19 as shown at 34 and at its lower end joins a transversely extending bayonet-type locking portion 36 located adjacent the cleft 27 in the solid portion of the otherwise tubular member. An identical but diametrically opposite horizontal slot portion 35a is cut into the opposite wall of the tube 19 and similarly terminates at its upper end at 34a and joins a transverse bayonet-type locking portion 36a at its lower end. Accordingly, each slot has a longitudinal portion 35 or 35a which extends from a point 34 or 34a near the upper end of the inner tube 19 to a point near the bottom of the longitudinal hole 26, and each also has a transverse portion 36 or 36a which extends counterclockwise, as viewed from below, approximately 90° around the tube 19 and terminates in a locking notch 37 or 37a. The far-side slot 35a is symmetrically disposed, relative to the near-side slot 35, in the diametrically opposite portion of the wall of the inner tube 19, having a similar upper end 34a, a longitudinal portion 35a and a transverse lower portion 36a with a bayonet locking notch 37a substantially identical with and correspondingly located in diametric opposition to those portions of the near-side slot portions 36 and 37. The form of the two opposed bayonet-type slots 36 and 36a in inner tube 19 are shown to good advantage in the exploded detail in Fig. 5.

As referred to above, the mounting plate 16 is welded to the hub 20a which in turn is formed upon or attached to the lower end of the outer tube 20 and, in the particular installation illustrated in the drawings, the mounting plate 16 is angularly disposed with respect to a plane perpendicular to the center-line or axis of the tube 20 in order to permit installation of the tube in a vertical position on the slanted lower skin 2a of the wing. A central opening 16a in the plate 16 is slightly larger than, and concentric with, the hole 20b in the tube 20 to which it opens. The hole 20b extends longitudinally from the bottom to a point near the top of the tube 20. A smaller longitudinal hole 20c of slightly larger diameter than that of the rod 22 extends downward from the top of the tube 20 into the longitudinal hole 20b.

As shown in Figs. 4 to 6, inclusive, a pair of bayonet-type slots is cut through the walls of the outer tube 20 on its near and far sides. The near slot has a longitudinally extending main portion 39 which has an upper end 38 located somewhat below the upper end of the tube 20 and at its lower end joins the transversely extending portion 40 which extends in a clockwise direction, as viewed from below, around the tube 20 and terminates in a locking notch 42 with an intermediate beveled portion 41 as shown in Fig. 5. The angularly beveled portion 41 cuts away the sharp right angle transition between the longitudinal slot 39 and the transverse slot 40, and it should be noted that the latter extends clockwise as distinguished from the counterclockwise extending slots 36 and 36a in the inner tube 19. Symmetrically disposed opposite the bayonet-type slot comprising the slot portions 39, 40 is a second, substantially identical slot having a like longitudinal portion 39a and a similarly clockwise extending lower portion 40a with an identical locking notch 42a.

As shown in Figs. 2 and 6, the plate 16 is symmetrically apertured by the holes 17a for the mounting fasteners or screws 17 by means of which the plate 16 is secured to the under-surface skin 2a. The outer spring 25 is externally disposed about the outside of the outer tube 20 and comprises a coiled wire spring which is squared and ground at its upper end 25a (Fig. 6) to bear against the transverse pin 23 and has at its opposite end, which bears against the hub 20a, a laterally extending arm portion 25b which terminates in an eye portion 25c adapted to be engaged by one of the attachment screws 17 by means of which the outer spring 25 is anchored to the assembly. The inner spring 24 is a simple coiled wire spring with squared ends and is of an initial length which is such that it is compressed between the lower end of the collar 22a on the rod 22 and the solid portion at the lower end of the tube 19 when the pin 23 engages the transverse slots 36 and 36a, the spring 24 being shown in its compressed condition in Fig. 3 and in its extended condition in the exploded view in Fig. 5. The diameter of the spring 24 permits it to readily fit and operate within the inner bore 26 of the inner tube 19.

The assembled retractable fitting assembly 10 is shown in its retracted position in Fig. 4 and in its extended operative condition in Fig. 6. In this extended operative position, the lower bifurcated terminal 21 of the inner tube 19 is pivotally connected by the pivot bolt 43 to the actuating component link 14, a terminal of which is disposed between the bifurcated prongs 28. As indicated above, the inner coil spring 24 is contained within the longitudinal bore 26 of the inner tube 19 and, as shown in Fig. 3, is compressed between the bottom of the hole 26 and the bottom of the collar portion 22a of the rod 22, thus urging the rod 22 upwardly. The major portion of the rod 22 lies within the longitudinal hole 26 of the inner tube 19, and the collar portion 22a is of a diameter freely permitting turning and longitudinal sliding, but permitting very little side play, of the rod 22 within the longitudinal hole 26 of the inner tube 19. As described above, the inner tube 19 containing the inner spring 24 and the rod 22 is slidably and turnably contained within the longitudinal bore 20b of the outer tube 20. The rod 22 with attached cable 13 protrudes through and is freely slidable and turnable in the hole 20c at the top of the outer tube 20. The lower end of the inner tube 19 is freely extendible downwardly within the outer tube 20 and through the central opening 16a of the plate 16, and is retractable into the outer tube 20 to a point where the top of the inner tube 19 engages the top of the outer tube 20 adjacent the hole 20c. The locking notches or detents 42 and 42a of the outer tube 20 are aligned with the corresponding locking notches 37 and 37a of the inner tube 19. The lock pin 23, which locks the retractable fitting 10 in its retracted position and limits its extension, is symmetrically mounted through the transverse pin hole 22b of the collar portion 22a of the rod 22. The locking pin 23 protrudes evenly through the locking notches 42, 42a and 37, 37a and compresses the outer spring 25 downward against the hub 20a adjacent the mounting plate 16. As shown in Fig. 2, the eye portion 25c of the outer spring 25 is threaded over and anchored by one of the fastening bolts 15, thus preventing sliding of the outer spring 25 on the outer tube 20.

The operation of the retractable fitting assembly 10 for emergency release of the mechanism 5 in the pylon 4 is as follows: The lock pin 23 rides in the slots of both tubes in the extended operative position of the retractable fitting assembly 10, and as shown in Fig. 6, the lock pin 23 rides in the aligned bayonet-type slots 35 and 35a of the inner tube 19, as well as the slots 39 and 39a of the outer tube 20. The pin 23 is held slightly above the transverse portions 40 and 40a of the outer tube slots 39 and 39a by the outer spring 25. The inner tube 19 is extended below the plate 16 through a distance which is limited by interference or engagement of the pin 23 with the upper ends 34 and 34a of the slots of the inner tube 19. When the inboard end of the wing cable 13 is connected through the previously described operating mechanism (including the cable 11 and the yoke 12) to the pilot's emergency bomb release handle 9 in the cockpit of the airplane, and when the inner tube 19 is connected at its two bifurcated prongs 28 by the fastener 43 to the linkage 14 and 15 of the emergency release mechanism within the pylon 4, pulling the emergency release handle 9 results in an upward motion of the rod 22 which is transmitted through the locking pin 23 and the inner tube 19 to the pylon-contained emergency release linkage and results in release of the bomb or other external store carried by the pylon. In moving upward, the lock pin 23 rides in the longitudinal vertical portions of the slots 39 and 39a of the outer tube 20 and when stopped in its upward motion by engagement with the upper terminals 38 and 38a of the slots it limits upward travel of the rod 22 and the inner tube 19.

When the associated pylon 4 is removed, it is desirable to retract the fitting 10 to a position wherein the lower end of the inner tube 19 is flush with the lower surface 2a of the wing 2 in which the fitting is installed. It is also desirable to maintain the rod 22 in substantially its lowest position relative to the rigidly mounted plate 16 in order that slack or play will not be introduced into the wing cable 13. With particular reference to Fig. 7, and continuing the reference to Fig. 6, retraction of the fitting 10 is accomplished as follows: In removal of the associated pylon 4 from the wing 2, the prongs 28 of the inner tube 19 are disconnected from the pylon-contained emergency release linkage component 14 which, with the fastener 43, is removed with the pylon. The fitting 10 is stowed in two steps, as outlined in the operating instructions of Fig. 7. In the first step, tube 19 is grasped and pulled downward against pressure of the spring 25 until the ends of the lock pin 23 lie respectively at the entrances of the outer tube transverse slot portions 40 and 40a. The inner tube 19 is then rotated in a clockwise direction, looking upwardly toward the wing under-surface, thus rotating pin 23 and rod 22 until pin 23 engages the closed ends of the slots 40 and 40a, whereupon the inner tube 19 is released, thus allowing the spring 25 to force pin 23 upward into locking notches 42 and 42a. Retained in the notches 42 and 42a, pin 23 locks rod 22 in a position wherein no slack is introduced into cable 13.

In the second step for stowing the fitting 10, a screwdriver is inserted into the cleft 27 between prongs 28 of inner tube 19, and by pressure applied to the screwdriver, tube 19 is pushed upward against opposition of spring 24 until the inner tube slot transverse portions 36 and 36a are opposite the pin 23. The inner tube 19 is then turned clockwise (looking upwardly) by means of the screw-driver until pin 23 engages the closed ends of the transverse slots 36 and 36a. Upon removal of the screw-driver, the inner spring 24 forces the tube 19 down, thus engaging the pin 23 in the locking notches 37 and 37a of tube 19, thereby locking the inner tube in a retracted position wherein its lower end 21 is substantially flush with the wing under-surface 2a.

The two steps involved in extending the retractable fitting assembly 10 are also given in the instructions shown in Fig. 7. In accomplishing the first step, a screw-driver is inserted in the bifurcated clevis 27 of the inner tube 19, the inner tube is pushed upward and turned counter-clockwise until the lock pin 23 interferes or engages with a side of the longitudinal portion 39 or 39a of each of the bayonet-type slots of the outer tube 20, and the inner tube 19 is allowed to be extended through the hole 18 in the lower skin 2a by the inner spring 24. In the second step, the rod 22 is unlocked and freed for upward motion by pulling downward on the inner tube 19 against the pressure of the outer spring 25 until the locking pin 23 is clear of the outer tube locking notches 42 and 42a, turning the inner tube 19 counterclockwise until the lock pin 23 is aligned with the outer tube longitudinal slot portions 39 and 39a, and releasing the inner tube 19. Forced upward by the outer spring 25, the lock pin 23 and the rod 22 move upward to a position in which the lock pin 23 is freely slidable in the outer tube slot longitudinal portions 39 and 39a, and inadvertent re-entry of the lock pin 23 into the outer tube locking notches 42 and 42a is therefore not possible.

It will, accordingly, be noted that in the retracted inoperative position of the retractable fitting assembly the locking pin is disposed in the locking notches of both the inner and outer tubes and that the rod and the attached cable are fixed thereby in a position in which there is no slack or play in the operating cable. In this retracted inoperative position of the assembly, both the inner and outer springs are compressed, and the locking pin is resiliently retained in the locking notches by the upward forces which these springs exert. When the lower end of the inner tube has been pushed upwardly and rotated such that it becomes free of the locking pin, and further rotation has freed the locking pin from the locking notches of the outer tube, the inner tube may be drawn downwardly or extended into the operative position in which it may be connected to the emergency release gear within the pylon. In this latter extended operative position, the locking pin is freely disposed within the longitudinal slots of the outer tube and the locking pin is also in engagement with the upper ends of the slots in the inner tube such that, when tension is applied to the cable, the pull exerted through the rod is transmitted directly to the walls of the inner tube by the laterally extending portions of the locking pin to thereby apply the force directly to the operating mechanism for the release gear in the pylon. It will, accordingly, be noted that the longitudinal slots in both the inner and outer tubes serve as lost-motion means in transforming the fitting from its retracted inoperative condition to the extended operative position which is accomplished by maintaining the locking pin in substantially the same position with respect to the lower skin of the wing whereby changes in cable length between the two positions are not required.

Whereas the rod member shown and described above has a terminal connected to an operating cable, it will be obvious that the improved device is equally applicable to a locking rod member which may be connected to the manual control device by other operating mechanism than the cable which has been shown for explanatory purposes. Similarly, while a pivot bolt connection has been shown at the lower terminal of the inner movable tube, it will also be understood that in certain installations other than the type disclosed it may be desirable that this terminal be provided with a disconnectable cable connector or other suitable device capable of transmitting the force from the locking rod member necessary for tripping the emergency release mechanism.

Other forms and modifications of the present invention, both with respect to its general arrangement and the details of its several parts, which may become apparent to those skilled in the art after reading the foregoing description, are intended to come within the scope and spirit of this invention as more particularly set forth in the appended claims.

I claim:

1. An extendible connector device comprising a fixed member having a tubular wall provided with a slot; a first movable member having a connector and further having a tubular wall provided with a slot, said first movable member being axially slidable, with respect to said fixed member, between retracted and extended positions; and a second movable member having a connector terminal and further having a projecting portion rotatable and slidable, in said slots provided in said walls, about and along the axes of said fixed and first movable members to a predetermined position wherein interference of said projecting portion with said walls of said fixed and first movable members locks all of said members in a retracted relationship.

2. An extendible connector device comprising a fixed member having a tubular wall provided with a slot; a first movable member having a connector and further having a tubular wall provided with a slot, said first movable member being axially slidable, with respect to said fixed member, between retracted and extended positions; a second movable member having a connector terminal and further having a projecting portion rotatable and slidable, in said slots provided in said walls, about and along the axes of said fixed and first movable members to a predetermined position wherein interference of said projecting portion with said walls of said fixed and first movable members locks all of said members in a retracted relationship, and resilient means urging the axial separation of said fixed and first movable members and the retention of said projecting portion in said predetermined position thereof.

3. An extendible connector device comprising a fixed member having a tubular wall provided with a slot; a first movable member having a connector and further having a tubular wall provided with a slot, said first movable member being axially slidable and rotatable, with respect to said fixed member, between retracted and extended positions; and a second movable member having a connector terminal and further having a projecting portion rotatable and slidable, upon sliding and rotational adjustment of said first movable member with respect to said fixed member, and in said slots provided in said walls of said fixed and first movable members, about and along the axes of said fixed and first movable members to a position wherein interference of said projecting portion with said slotted walls of said fixed and first movable members locks all of said members in a retracted relationship.

4. An extendible connector device comprising a fixed member having a tubular wall provided with a slot; a first movable member provided with a connector and having a tubular wall provided with a slot, said first movable member being axially slidable and rotatable, with respect to said fixed body member, between retracted and extended positions; a second movable member having a connector terminal and a projecting portion engageable with the slotted tubular walls of said fixed and first movable members and movable in said slots, upon sliding and rotational adjustment of said first movable member with respect to said fixed member, to a predetermined position wherein interference of said projecting portion with said slotted walls locks all of said members in a retracted relationship; and resilient means which, while urging the axial separation of said fixed and first movable members, effects the retention of said projecting portion in said predetermined position thereof.

5. A connector device selectively extendible through an opening in a wall, said device comprising a body member having an internal bore and an open ended portion attached to the wall about said opening; a tubular connector member telescopically slidable within the bore of said body member, said connector member having a connector terminal portion extendible through said opening in said wall, said body member and said connector member having cooperating lost-motion and detent slots formed therein; and a movable member having a connector terminal and a locking portion engageable with the lost-motion and detent slots of said body and connector members and so constructed and arranged that, in an extended position of said connector member, operating forces may be transmitted therethrough from the connector terminal of said movable member to the extended connector terminal of said connector member.

6. A connector device selectively extendible through an opening in a wall, said device comprising a body member having an internal bore and an open ended portion attached to the wall about said opening; a tubular connector member telescopically slidable within the bore of said body member, said connector member having a connector terminal portion extendible through said opening in said wall, said body member and said connector member having cooperating lost-motion and detent slots formed therein; resilient means urging the axial separation of said body and connector members; and a movable member having a connector terminal and a locking portion engageable with the lost-motion and detent slots of said body and connector members and so constructed and arranged that, in an extended position of said connector member, operating forces may be transmitted therethrough from the connector terminal of said movable member to the extended connector terminal of said connector member.

7. A connector device selectively extendible through an opening in a wall, said device comprising a body member having an internal bore and an open ended portion attached to the wall about said opening; a tubular connector member telescopically slidable and rotatable within the bore of said body member, said connector member having a connector terminal portion extendible through said opening in said wall, said body member and said connector member having cooperating lost-motion and detent slots formed therein; resilient means urging the axial separation of said body and connector members; and a movable member having a connector terminal and a locking portion engageable, in a sliding and rotational adjustment of said connector member, with the lost-motion and detent slots of said body and connector members and so constructed and arranged that in an extended position of said connector member, operating forces may be transmitted from the connector terminal of said movable member to the extended connector terminal of said connector member.

8. A connector device selectively extendible through an opening in a wall, said device comprising a body member having an internal bore and an open ended portion attached to the wall about said opening; a connector member telescopically slidable and rotatable within the bore of said body member, said connector member having a connector terminal portion extendible through said opening in said wall, said body member and said connector member having cooperating lost-motion and detent slots formed therein; resilient means urging the axial separation of said body and connector members; and a movable member having a connector terminal and a locking portion engageable, in a sliding and rotational adjustment of said connector member, with the lost-motion and detent slots of said body and connector members and so constructed and arranged that, in an extended position of said connector member, operating forces may be transmitted from the connector terminal of said movable member to the extended connector terminal of said connector member and, in a fully retracted, telescoped condition of said connector member within said body member in which said connector member terminal lies substantially flush with said wall adjacent said opening, said movable member engages the detent slots of both said body and connector members for securely locking all three said members in a retracted relationship without the occurrence of play or slack in an operating mechanism attached to the connector terminal of said movable member.

9. A connector device comprising a first member having an internal bore; a second member axially slidable within the bore of said first member, said second member having a connector terminal at one end and a tubular portion with an internal bore at its other end, said first and second members having longitudinally extending slots and transversely extending locking slots disposed in the bored portions thereof; and a third member having a connector terminal portion and a locking portion engageable with said slots of said first and second members, said first, second, and third members being so constructed and arranged that said second member may be locked with respect to said first member in a retracted position by the engagement of said transversely extending locking slots by said locking portion of said third member, and disengagement of said third member locking portion from said transversely extending locking slots permits said second member to be extended to an operative position with respect to said first member.

10. In an aircraft, a connector device comprising a first member having an internal bore, said first member being attached to an aircraft skin adjacent an opening therein; a second member axially slidable within the bore of said first member, said second member having a connector terminal at one end and a tubular portion with an internal bore at its other end, said first and second members having longitudinally extending slots and transversely extending locking slots disposed in the bored portions thereof; and a third member having a connector terminal portion and a locking portion engageable with said slots of said first and second members, said first, second, and third members being so constructed and arranged that said second member may be locked with respect to said first member in a retracted position substantially flush with said aircraft skin by the engagement of said transversely extending locking slots by said locking portion of said third member, and disengagement of said locking portion of said third member from said transversely extending locking slots permits said second member to be extended through said skin to an operative position with respect to said first member.

11. A connector device comprising a first member having an internal bore; a second member axially slidable and rotatable within the bore of said first member, said second member having a connector terminal at one end and a tubular portion with an internal bore at its other end, said first and second members having longitudinally extending slots and transversely extending locking slots disposed in the bored portions thereof; and a third member having a connector terminal portion and a locking portion engageable with said slots of said first and second members, said first, second, and third members being so constructed and arranged that said second member may be locked with respect to said first member in a retracted position by the engagement of said transversely extending locking slots by said locking portion of said third member, and disengagement of said third member locking portion from said transversely extending locking slots permits said second member to be extended to an operative position with respect to said first member.

12. In an aircrfat, a connector devise comprising a first member having an internal bore, said first member being attached to an aircraft skin adjacent an opening therein; a second member axially slidable and rotatable within the bore of said first member, said second member having a connector terminal at one end and a tubular portion with an internal bore at its other end, said first and second members having longitudinally extending slots and transversely extending locking slots disposed in the bored portions thereof; and a third member having a connector terminal portion and a locking portion engageable with said slots of said first and second members, said first, second, and third members being so constructed and arranged that said second member may be locked in a position wherein said second member is retracted with respect to said first member and is substantially flush with said aircraft skin by the engagement of said transversely extending locking slots by the locking portion of said third member, and disengagement of said third member locking portion from said transversely extending slots permits said second member to be extended through said skin to an operative position with respect to said first member, said engagement and disengagement being effected by axial sliding and rotation of said second member with respect to said first member.

References Cited in the file of this patent

UNITED STATES PATENTS

| | | |
|---|---|---|
| 854,742 | Hill | May 28, 1907 |
| 2,126,234 | Weber | Aug. 9, 1938 |
| 2,733,885 | Brown | Feb. 7, 1956 |